United States Patent [19]

Pohto et al.

[11] 4,154,667
[45] May 15, 1979

[54] METHOD OF CONVERTING BOX ANODES TO EXPANDABLE ANODES

[75] Inventors: Gerald R. Pohto; Richard O. Olson, both of Mentor, Ohio

[73] Assignee: Diamond Shamrock Corporation, Cleveland, Ohio

[21] Appl. No.: 866,557

[22] Filed: Jan. 3, 1978

[51] Int. Cl.² .................. C25B 11/02; H01R 43/00
[52] U.S. Cl. ............................ 204/286; 204/288; 29/628
[58] Field of Search ............... 204/286, 288, 252; 29/624, 628

[56] References Cited

U.S. PATENT DOCUMENTS

| 3,674,676 | 7/1972 | Fogelman | 204/288 X |
|---|---|---|---|
| 3,940,328 | 2/1976 | Thomas et al. | 204/252 X |
| 4,033,849 | 7/1977 | Pohto et al. | 204/288 X |
| 4,078,987 | 3/1978 | Specht | 204/263 X |
| 4,088,558 | 5/1978 | Fabian et al. | 204/288 |

*Primary Examiner*—Howard S. Williams
*Assistant Examiner*—D. R. Valentine
*Attorney, Agent, or Firm*—Stephen A. Littlefield

[57] ABSTRACT

Disclosed is a method for converting box form dimensionally stable anodes to the more useful and energy-saving expandable type. In one embodiment, anode box plates are cut off the anode riser at the closest point thereto. Expander springs are then attached to the anode riser and the anode box plates which have been cut into quarter panels, sized and spliced together to form new anode plates are rewelded to the expander springs. Alternatively, the method comprises the steps of cutting away only the end portions of the box anode structure and bending remaining portions of the anode screens into a spring form similar to expander springs and attaching a new pair of anode plates or screens to adjacent pairs of these newly formed springs. The anodes may then be substituted in a diaphragm-type electrolytic cell for the production of alkali metal hydroxides and halogen and the energy savings associated with the use of expandable anodes may thereby be realized.

9 Claims, 11 Drawing Figures

METHOD OF CONVERTING BOX ANODES TO EXPANDABLE ANODES

BACKGROUND OF THE INVENTION

One of the most commercially significant applications of electrolysis is the production of halogens, particularly chlorine, and alkali metal hydroxides, particularly sodium hydroxide, by the electrolysis of alkali metal halide solutions in diaphragm-type electrolytic cells. The configuration and operation of a diaphragm-type electrolytic cell is well known to those skilled in the art. A cell generally consists of three basic elements, that is an anode base, a cathode can, and a cover portion. The anode base serves as both anodic conductive member of the cell and as a support for the anode risers which extend in parallel between the parallel cathode tubes disposed in the cathode can. In one design of such a cell, anode plates extend vertically from a sealed cell base and a cathode can comprising four sides with a plurality of transverse, vertically-oriented, rectangular cathode tubes is positioned so that the anode plates are intermediate adjacent pairs of cathode tubes. A cover is then placed above the cathode can and the anodes which cover contains the required hyraulic head of brine solution and the collector for halogen gas produced at the anodes. The cathode tubes generally have a foraminous structure and, in addition to serving as the cathodic electrolysis surface, the external surfaces of the cathode tubes serve as a support structure for the diaphragm which is often a layer of asbestos fibers serving to separate the anode and cathode compartments of the cell.

As originally conceived, diaphragm cell anodes were formed of graphite. The problem of surface erosion due to factors such as gas formation thereon soon led to the development of the dimensionally stable anode comprising a valve metal base having an electrocatalytically active metal or metal oxide coating applied to the surface thereof. Such dimensionally stable anodes were originally conceived in box form and because of the variation in diaphragm thicknesses, they had to be of a somewhat narrow width so that they would not interfere with the diaphragm during installation of the cathode can onto the anode base after the anodes were in position. This necessity of narrow box anodes resulted in relatively wide anode to cathode spacings. However, since erosion of the anode was no longer a problem, these box-form anodes found wide acceptance as replacements for former graphite anodes in diaphragm-type electrolytic cells.

In recent years, the box-form anode has been replaced in new diaphragm cell installations by an expandable-type anode. The expandable anode is utilized in a compressed form during installation and once the cathode can is in position, spacer members may be either inserted or compression clips removed from the anode structure so that the anode surfaces may resiliently expand outwardly to close the gap between the anode and cathode surfaces resulting in significant savings in energy due to the lowered electrical resistance within the reduced gap. An anode of this type is described in U.S. Pat. No. 3,674,676.

While the economic advantages of expandable anodes are well known, it would be extremely expensive for a chlorine and caustic producer to dispose of his old style box anodes and replace them with the new, energy-saving expandable type. The fabrication cost, as well as the cost of materials for completely new anodes, would be prohibitive.

It is therefore a principal object of this invention to make use of the old style box anode as a basis structure which could be converted to allow chlorine and caustic producers now utilizing such box anodes to obtain the economic benefits of expandable type dimensionally stable anodes without the high capital cost of disposal of old box anodes and purchase of all-new expandable types.

It is a further object of this invention to utilize all or nearly all of the existing box anode structure in an economically feasible conversion to expandable anodes.

SUMMARY OF THE INVENTION

The above objects of the invention are accomplished by a method to be described hereinafter.

In accordance with the invention, a box-style anode comprising a tubular anode riser having a base portion and a pair of parallel, foraminous, substantially rectangular plate members welded to opposite sides of the riser is converted to an expandable-type anode through a method comprising the steps of cutting away a portion of the anode plate members adjacent the riser, associating resilient expander members with the anode riser and attaching a new pair of anode plate members to the expander members at a point remote from the anode riser.

Further in accordance with the invention, a box-style anode of the type described is converted to an expandable anode by cutting off the anode plate members immediately adjacent the anode riser leaving a small amount of anode plate attached to the anode riser, attaching resilient expander members to the anode riser adjacent the remaining portions of the anode plate members, cutting the removed anode plate members into quarter panels and reassembling the quarter panels utilizing an intermediate splice portion to form two anode plate members and attaching these plate members to the expander members to form an expandable anode.

As used in this specification, the term "associating" will be understood to include attaching, bending, forming, welding or any other process step which results in expander members being associated with and attached to an anode riser.

Still further in accordance with the invention, a box style anode comprising a central anode riser having a base portion and a pair of foraminous, substantially rectangular plate members attached in parallel to opposite sides of the riser are cut so as to produce two parallel extending leaf portions extending from each side of the anode riser. Each of the pair of leaf portions associated with one side of the anode riser are then bent so that their ends remote from the anode riser are resiliently convergent relative to their previously disposed position. A pair of new foraminous anode plates are then connected to opposite pairs of the original leaves such that the leaves provide a spring effect to the parallel convergence of the new pair of foraminous anode plates.

Further in accordance with the invention, the anode plates are connected to leaf pairs which are located on the same side of the anode riser.

Still further in accordance with the invention, the anode plates are connected to leaf pairs which are on opposite sides of the anode riser.

BRIEF DESCRIPTION OF THE DRAWINGS

The invention will be more fully described in the more limited aspects of a preferred embodiment thereof as illustrated in the accompanying drawings forming a part of this specification in which.

DETAILED DESCRIPTION OF THE PREFERRED EMBODIMENTS AND DRAWINGS

The invention will hereinafter be described in terms of a preferred embodiment of the invention as illustrated in the accompanying drawings forming a part of this specification. It will be understood that only preferred embodiments of the invention are described and that other modifications are possible within the scope of the invention. The reference members used to identify the various individual parts of the invention are used for that part throughout the figures for purposes of clarity.

Figure 1:
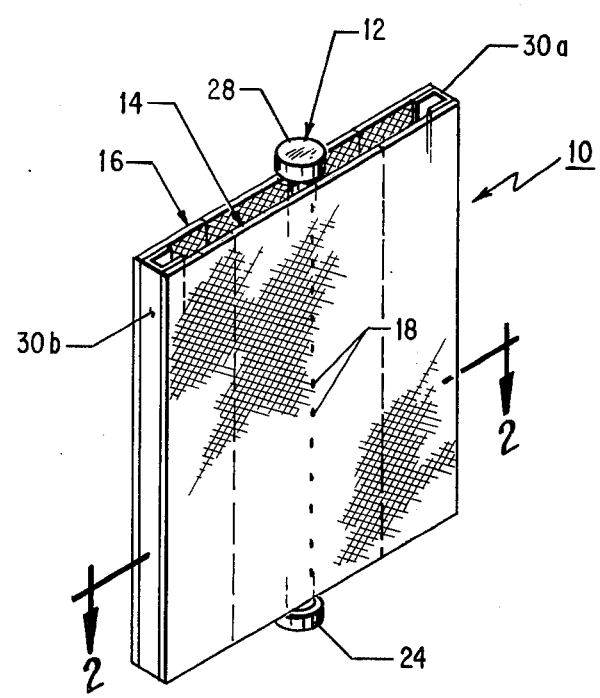
FIG. 1 is a perspective view of a box-style anode.
Figure 2:
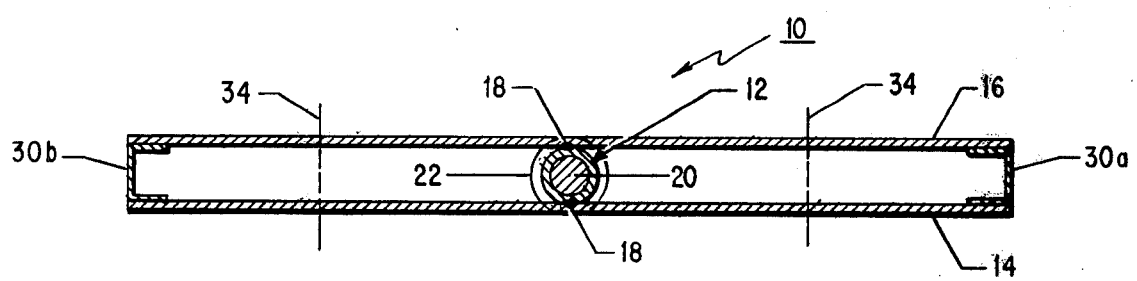
FIG. 2 is a top cross-sectional view of the box anode shown in FIG. 1 taken along line 2—2 thereof.
Figure 3:
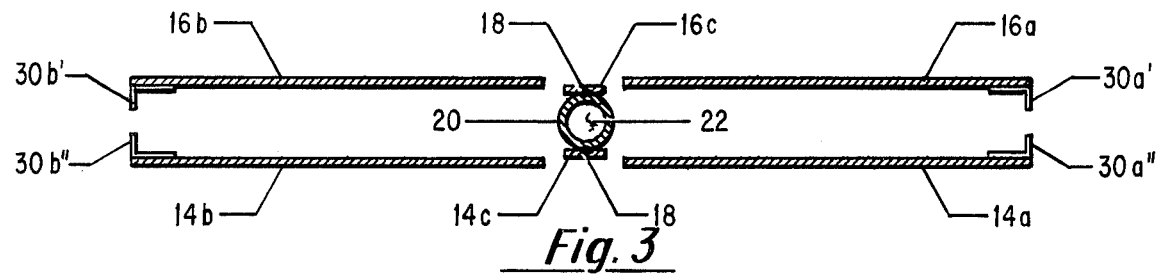
FIG. 3 is a cross-sectional view of the box-style anode shown in FIG. 1 in which portions of the anode plates have been cut off in accordance with one preferred method of the invention.

Referring now to the figures, FIG. 1 shows a typical box-style anode assembly 10 comprising an anode riser member 12 to which anode plates 14, 16 are welded as at welds 18. Anode riser 12 comprises generally a cylindrical member having a conductive core 20 which has a titanium cover 22 clad or otherwise applied to the core 20. Anode plates 14, 16 may take any form but are generally of a foraminous structure having a plurality of openings therethrough so that the evolution of gas at the surface of the anode is facilitated and a large surface area is presented. The anode plates 14, 16 are usually made of a valve metal such as titanium and are preferably coated with an electrocatalytic metal or metal oxide as is common in the art. Anode plates 14, 16 have a configuration so that they may be joined to each other at their ends by butt or lap joints. Flange members 24 is located at the base portion of the anode riser 12 and constitutes a mounting flange for attaching the anode riser to the anode base of an electrolytic cell. Titanium cap member 28 is positioned over the top end of the anode riser 12 so as to totally enclose and seal the copper core 20 at the upper end of the anode riser 12. As seen in FIG. 2, the anode plates 14, 16 and end members 30 form a four-sided box enclosure which is substantially rigid and, when installed in an electrolytic cell, is in a position relative to the adjacent cathode tubes which cannot be varied.

In accordance with the invention, box anode 10 may be converted from a rigid structure to an expandable-type anode having all of the economic advantages inherent thereto through a process to be described hereinafter.

FIGS. 2 through 6 illustrate one preferred method of converting a box style anode to an expandable anode.

The first step is to remove plate members 14, and 16 from anode riser member 12 at a point adjacent the attaching welds 18. This may be accomplished by any of several cutting processes such as grinding, shearing, sawing, laser cutting or the like. Anode plate quarter sections 14a and 16a are connected by transverse member 30a and form a U-shaped member upon separation from anode riser 12. Similarly, anode quarter sections 14b and 16b have a U-shape through their interconnection by end member 30b. A small portion 14c, 16c of each anode plate member 14, 16 is left attached to anode riser 12 by welds 18. End portions 30a and 30b are then cut by any of the above-mentioned processes to separate plate members 14a, 16a and 14b, 16b.

Figure 4:
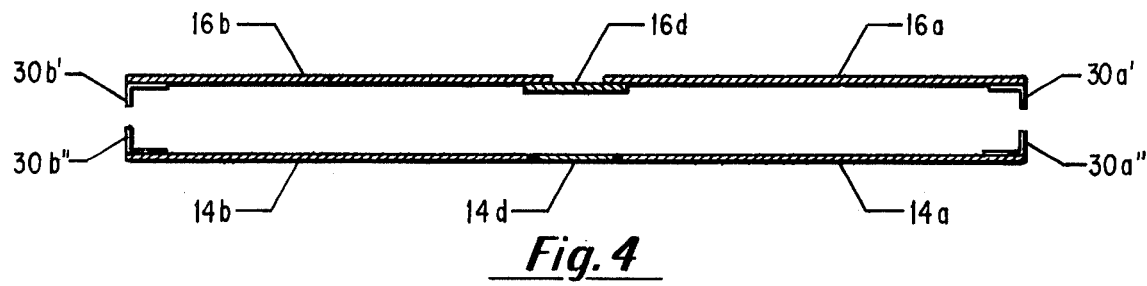
FIG. 4 is a cross-sectional view illustrating the reconstruction of anode plates in accordance with the invention.
Figure 5:
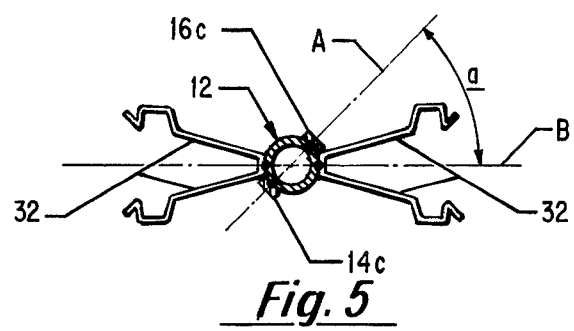
FIG. 5 is a cross-sectional view illustrating the attachment of expander members to the anode riser in accordance with the invention.
Figure 6:
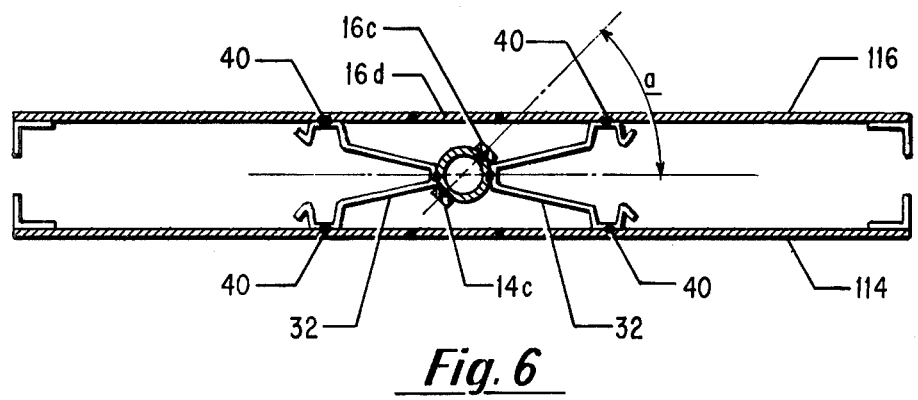
FIG. 6 illustrates the final assembly of the anode riser having expander portions and the repaired mesh portion to form an expandable anode.

Following the removal of anode plate quarter sections 14a, 14b and 16a, 16b these portions are rejoined as illustrated in FIG. 4 by welding a new center section 14d, 16d to the corresponding anode quarter sections. Resistance welding is preferred for this splicing procedure since the parts are fused during the process resulting in a flat, planar repaired screen. It will be understood, however, that resistance welding is merely preferred and any other welding process may be utilized to accomplish this result. Center members 14d, 16d are of anode material similar to that forming the original anode plates 14, 16. The anode plate members are now in a condition to be straightened, flattened and coated with electrocatalytic material, if necessary, prior to attachment to an anode riser.

Anode riser 12 having the attached residual pieces 14c, 16c is utilized as a mounting side for resilient anode expanders 32 which are common in the art of expandable anodes. Any common form of anode expander may be utilized, one anode expander being mounted at a point diametrically opposite the other anode expander 32 on anode riser 12. In accordance with a preferred embodiment of the invention, the anode riser 12 is oriented so that a plane A passing through welds 18 is disposed at an acute angle a relative to a plane B defined by the center axes of anode expanders 32. This avoids interference between residual center portions 14c, 16c and an installed plate member when the anode is a compressed condition. It will be understood that this is only a preferred step and that anode riser 12 may be oriented in any manner with respect to anode expanders 32.

Finally, in accordance with the invention, new and/or reassembled anode plate members 114, 116 are attached as at welds 40 to the anode expanders to complete the expandable anode structure. As used in this specification, the term "new" anode plate member will be understood to mean a reassembled or remanufactured anode plate as well as a totally new plate.

An altenate method of converting a box anode to an expandable anode utilizes portions of the anode plate members 14 and 16 to form the anode expanders to which totally new anode plates are then attached. This alternative method is illustrated in FIGS. 7 through 11 and described hereinafter.

Initially, the end portions of box anode 10 are removed by cutting the anode plates 14, 16 along a vertical plane which is parallel to and spaced from the anode riser 12 on either side thereof as along dotted lines 34 as shown in FIG. 2.

Figure 7:
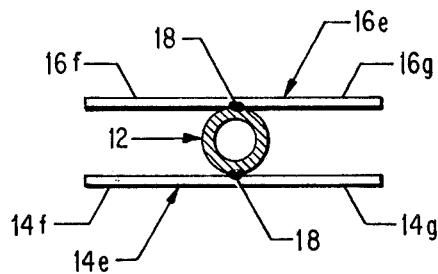
FIG. 7 is a cross-sectional view similar to that of FIG. 3 illustrating an alternate method of cutting away the anode plate members.

The remaining structure as shown in FIG. 7 comprises anode riser 12 having portions of anode plates 14e, 16e welded thereto at welds 18, each anode plate 14e, 16e comprising a pair of co-linear leaves 14f, 14g and 16f, 16g. It is these anode leaves 14f, 14g, 16f, 16g which will ultimately comprise the resilient anode expanders of the newly formed expandable anode made in accordance with one preferred embodiment of the present invention.

Figure 8:
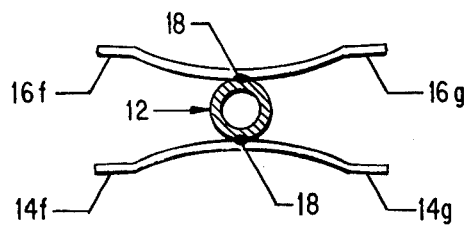
FIG. 8 is a cross-sectional view of the anode structure shown in FIG. 7 in which portions of the leaves have been bent to spring-like form.
Figure 9:
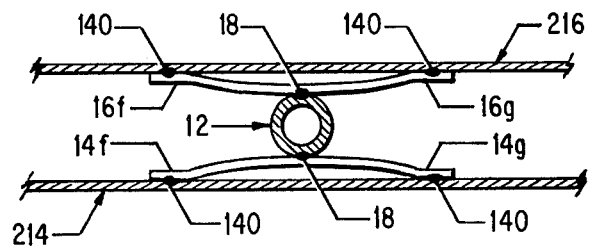
FIG. 9 is a cross-sectional view of the anode riser and leaf portions shown in FIG. 8 wherein new foraminous anode plates have been attached thereto.

One of these alternate embodiments of the new expandable anode formed in accordance with the invention is illustrated in FIGS. 8 and 9. As shown therein, leaf pairs 14f, 14g are bent from a pivot point at weld 18 laterally away from corresponding leaf pairs 16f, 16g so that the end portions of the paired leaves remote from welds 18 are resiliently convergent relative to their original co-planar position. A new anode plate member 214 is then attached by welds 140 to the end portions of leaf pairs 14f, 14g and, similarly, new anode plate member 216 is attached to the end portions of anode leaf pairs 16f, 16g. Leaf pairs 14f, 14g, and 16f, 16g form anode expanders similar to anode expanders 32 and act to resiliently expand new anode plate members 214, 216 away from each other when properly installed in an electrolytic cell. For installation in a cell, or removal therefrom, anode plate members 214, 216 may be compressed together and an appropriate clip applied thereto so as to maintain such plates in a compressed condition for ease of installation and removal from an electrolytic cell.

Figure 10:
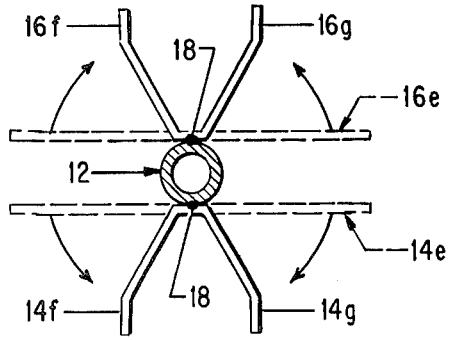
FIG. 10 is a cross-sectional view similar to that shown in FIG. 8 in which the anode leaves have been bent in an alternative manner.
Figure 11:
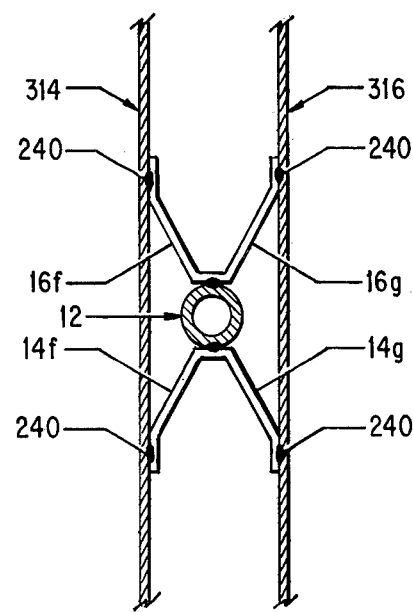
FIG. 11 is a cross-sectional view of the anode portion shown in FIG. 10 having foraminous anode plates secured thereto.

FIGS. 10 and 11 show another alternate embodiment of the subject invention in which anode leaf portions 14f and 14g are radically bent so that their end portions are closely convergent with respect to their former co-planar positions. Similarly, anode leaf portions 16f and 16g are similarly bent so that their end portions are convergent. In accordance with the invention, new anode plate member 314 is attached at welds 240 to the end portions of anode leaf members 14f, 16f and similarly, anode plate member 316 is welded to the end portions of anode leaf members 14g, 16g providing a resilient structure similar to that shown in FIG. 5 which may be similarly compressed for installation and removal from an electroylic cell using an appropriate clip member and, with the removal of such clip member, the anode plate members 314, 316 will expand laterally from each other through the spring action of leaf members 14f, 16f and 14g, 16g.

While the invention has been described in the more limited aspects of a preferred embodiment, other embodiments of the invention have been suggested and still others will occur to those skilled in the art upon the reading and understanding of the foregoing specification. It is intended that all such embodiments be included within the scope of the invention as limited only by the appended claims and their equivalents.

What is claimed is:

1. A method of producing an expandable-type anode from a rigid box-style anode having an anode riser and a pair of parallel anode plates attached thereto by weld portions, said anode plate being disposed on opposite sides of said anode riser, the method comprising the steps of:

removing a portion of said anode plates from said anode riser adjacent said welds;

associating a pair of resilient anode expanders with said anode riser, said anode expanders having end points disposed away from said anode riser and defining two parallel, vertical planes disposed on opposite sides of said anode riser, and attaching new anode plate members to said anode expanders at said points disposed away from said anode riser, whereby said new anode plate members lie on each parallel vertical planes and are resiliently moveable relative to each other and said anode riser.

2. The method as described in claim 1 wherein said anode plate members are removed from said anode riser by cutting said anode plate members immediately adjacent said welds and wherein the step of associating said anode expanders with said anode risers comprises attaching a pair of anode expanders to said anode riser.

3. The method as described in claim 2 further including the step of reassembling said anode plate members cut from said box-style anode to form a repaired anode plate and attaching said repaired anode plate to said anode expanders.

4. The method as described in claim 3 wherein said step of reassembling includes resistance welding said anode plate members.

5. The method as described in claim 2 further including the step of rotating said anode riser so that a plane defined by said welds is disposed at an acute angle relative to an axis passing through and bisecting said anode expanders.

6. The method as described in claim 1 wherein said step of associating said resilient anode expanders with said anode riser comprises bending residual portions of said anode plate members following said step of removing so that said residual portion which are disposed on the same side of said anode riser have end portions which are resiliently convergent relative to their coplaner initial position to form anode expanders.

7. The method as described in claim 6 wherein said step of attaching said new anode plate members comprises welding said plate members to said end portions.

8. The method as described in claim 6 wherein said step of attaching comprises welding said new anode plates to said end portions of said anode residual portions so that said new anode plate is perpendicular to a plane defined by said welds.

9. The method as described in claim 6 wherein said step of attaching comprises the step of welding said new anode plates to said end portions of said residual anode portions so that said new anode plates are parallel to a plane defined by said welds.

* * * * *